United States Patent [19]

Shiraishi et al.

[11] 4,003,978
[45] Jan. 18, 1977

[54] METHOD FOR TREATING AMMONIA-CONTAINING GASES

[75] Inventors: Tatsuo Shiraishi; Shinkichi Shimizu; Hiroshi Ichihashi; Tadashi Shindo; Fumiyoshi Kato, all of Niihama, Japan

[73] Assignee: Sumitomo Chemical Company, Limited, Osaka, Japan

[22] Filed: Oct. 18, 1974

[21] Appl. No.: 515,888

[30] Foreign Application Priority Data

Oct. 24, 1973 Japan ............................ 48-120185
Apr. 25, 1974 Japan ............................ 49-47350

[52] U.S. Cl. .......................... 423/237; 252/468; 252/469; 252/432; 252/437; 252/439; 252/467; 252/470; 423/239; 423/351

[51] Int. Cl.² ..................................... C01B 21/02

[58] Field of Search .......... 423/237, 238, 239, 235, 423/219, 400, 404, 580, 405, 351; 252/467

[56] References Cited

UNITED STATES PATENTS

| | | | |
|---|---|---|---|
| 1,558,598 | 10/1925 | Ellis | 423/404 |
| 1,918,038 | 7/1933 | Jaeger | 423/404 |
| 3,467,491 | 9/1969 | Hardison | 423/237 |
| 3,511,596 | 5/1970 | Adler | 423/237 |

FOREIGN PATENTS OR APPLICATIONS

| | | | |
|---|---|---|---|
| 79,049 | 11/1919 | Germany | 423/404 |
| 302,514 | 1/1920 | Germany | 423/404 |

*Primary Examiner*—L. Dewayne Rutledge
*Assistant Examiner*—Michael L. Lewis
*Attorney, Agent, or Firm*—Stewart and Kolasch, Ltd.

[57] ABSTRACT

A method for treating ammonia-containing gases for removing ammonia therefrom, which comprises contacting the ammonia-containing gases with a metal oxide catalyst having the following formula:

$$Cr_xA_yO_z$$

wherein Cr is chromium; A is at least one element selected from the group consisting of tin, antimony, vanadium, cobalt, silver, zinc, nickel, titanium, molybdenum, tungsten, sulfur, phosphorus, boron, germanium and zirconium; x is a numeral of 4 to 12; y is a numeral of 0.2 to 8 and z is a numeral of 6.2 to 42, in a vapor phase at a temperature of from 200° to 500° C in the presence of molecular oxygen, and thereby the ammonia is oxidized to harmless nitrogen gas.

6 Claims, No Drawings

METHOD FOR TREATING AMMONIA-CONTAINING GASES

The present invention relates to a method for treating ammonia-containing gases. More particularly, it relates to a method for treating ammonia-containing gases which is characterized in that the ammonia-containing gases are contacted with a metal oxide catalyst in a vapor phase at a high temperature in the presence of molecular oxygen, and thereby the ammonia is oxidized to harmless nitrogen gas.

Ammonia exists in a large amount in nature, but it has a bad smell, and therefore, it is necessary to avoid the discharge thereof into the atmosphere. Besides, when ammonia or ammonium ion in waste water is discharged into rivers or seas, it promotes the growth of duckweeds or seaweeds and may sometimes cause the occurrence of red water. In any event, one of the causes of environmental pollution is the discharge of synthetic materials into the atmosphere, rivers, seas, lakes, swamps or the like, and such discharge should be avoided. Accordingly, the prevention of the discharge of ammonia into nature is one of the most important techniques for preventing environmental pollution.

The present inventors have intensively studied to find a suitable method for the selective removal of ammonia from waste water or waste gases, and have found that it can be effectively achieved by oxidizing catalytically the ammonia-containing gases in a vapor phase at a high temperature in the presence of molecular oxygen.

An object of the present invention is to provide a method for treating ammonia-containing gases for removing ammonia therefrom.

Another object of the invention is to provide a method for oxidizing ammonia to a harmless nitrogen gas by contacting ammonia-containing gases with a metal oxide catalyst in a vapor phase at a high temperature in the presence of the oxygen.

A further object of the invention is to provide a metal oxide catalyst useful for the selective removal of ammonia from waste water or waste gases.

These and other objects of the invention will be apparent from the description hereinafter.

According to the present invention, the ammonia-containing gases are oxidized in a vapor phase at a high temperature in the presence of molecular oxygen by using a suitable metal oxide catalyst, and thereby the ammonia is oxidatively destructed to a harmless nitrogen gas and water as shown in the following reaction scheme:

$$4NH_3 + 3O_2 \rightarrow 2N_2 + 6H_2O \qquad (1)$$

After extensively studying to find a suitable catalyst useful for the above oxidation and therefore measuring the activity of various metals and metal oxides on the ammonia oxidation reaction, the present inventors have found that a chromium oxide, a manganese oxide, a silver oxide, ruthenium, rhodium, palladium or platinum shows high activity for the ammonia oxidation reaction.

However, when ammonia is oxidized in a vapor phase at a high temperature, in addition to the above reaction (1), a side reaction as shown in the following reaction scheme (2), which is well known in the nitric acid synthesis, is partialy proceeded:

$$4NH_3 + (2x + 3)O_2 \rightarrow 4NO_x + 6H_2O \qquad (2)$$

and therefore, harmful nitrogen oxides ($NO_x$) are, rather, undesirably produced from ammonia.

Particularly, although a chromium oxide is a high active catalyst for ammonia oxidation and shows an activity even at a comparatively low temperature as 300° – 350° C, it has a disadvantage of producing a large amount of nitrogen oxides, for instance, it is reported that it has 66 % of selectivity of producing nitrogen monoxide (NO) by N. M. Morozov [Kinetika i Kataliz Vol. 7 (1), pages 172 – 175 (1966)]. Moreover, when chromium oxide is used as a catalyst, a further side reaction as shown in the following reaction scheme (3) is partially proceeded and thereby nitrous oxide is produced:

$$2NH_3 + 2O_2 \rightarrow N_2O + 3H_2O \qquad (3)$$

According to the new finding by the present inventors, on the contrary, the chromium oxide having such a defect of producing a large of amount of nitrogen oxides can be effectively used for the selective removal of ammonia when it is combined with other elements to form a complex oxide compound or a chromate. That is, it has been found that reaction (1) selectively proceeds with the chromium oxide combined with other element with an extremely decreased production of nitrogen oxides and that said chromium oxide compound can be used even at a comparatively low concentration of ammonia as from a few ppm to a few thousand ppm.

The present invention provides a method for treating ammonia-containing gases comprising contacting the ammonia-containing gases with a metal oxide catalyst having the following formula:

$$Cr_xA_yO_z$$

wherein Cr is chromium; A is at least one element selected from the group consisting of tin, antimony, vanadium, cobalt, silver, zinc, nickel, titanium, molybdenum, tungsten, sulfur, phosphorus, boron, germanium and zirconium; x is a numeral of 4 to 12; y is a numeral of 0.2 to 8 and z is a numeral of 6.2 to 42, in a vapor phase at a temperature of 200° to 500° C in the presence of molecular oxygen, and thereby removing the ammonia from the gases.

The method of the present invention can be applied to the gases containing a comparatively low concentration of ammonia such as a gaseous concentration of up to 5,000 ppm, and therefore, can be used for the selective removal of ammonia which is released during the course of the synthesis of various chemicals or stripped out from waste water.

In the ammonia-containing gases to be treated, usually, molecular oxygen coexists with the ammonia, and therefore, it is not necessary to add additional molecular oxygen thereto. However, when no oxygen is contained or therein or the content of the oxygen is less than the molarity of the ammonia, it is necessary to add molecular oxygen or air to the gases to be treated so that the molar ratio of oxygen to ammonia is one or more. Besides, the ammonia-containing gases sometimes contain steam, but the present method can be applied to such gases without any undesirable effect. The present method can also be applied to the gases containing carbon monoxide, carbon dioxide, sulfur dioxide, a slight amount of lower hydrocarbon, hydrogen, or the like without any undesirable effect.

The method of the present invention may be carried out at a temperature of 200° to 500° C, more preferably 250° to 450° C. When the temperature is lower than 200° C, the reaction velocity is so slow that the method is unpractical, and on the other hand, when it is over 500° C, it results in an increase of the production of nitrogen oxides.

The suitable space velocity in the present method may be 100,000 hr$^{-1}$ or less, and particularly the preferred space velocity may be in a range of 1,000 to 50,000 hr$^{-1}$. When the space velocity is more than 100,000 hr$^{-1}$, the removal rate of ammonia lowers, and on the other hand, when it is less than 1,000 hr$^{-1}$, the removal rate of ammonia is high and further the reaction can be carried out even at a low temperature, and it is useful on the laboratory scale, but it is not necessarily suitable on the industrial scale because it requires a great amount of catalyst and also a large scale of apparatus and is not economical.

In the present catalyst, the ratio of x which means the atomic number of chromium and y which means the atomic number of one or more elements selected from tin, antimony, vanadium, cobalt, silver, zinc, nickel, titanium, molybdenum, tungsten, sulfur, phosphorus, boron, germanium and zirconium may be preferably in a range of 11.5 : 0.5 to 6 : 6. When the ratio of chromium is over 11.5 : 0.5, the reactivity of ammonia may be high, but the amount of the side-produced nitrogen oxides disadvantageously increases. On the other hand, when the ratio of chromium; is less than 6 : 6, the production of nitrogen oxides may be slight, but the reactivity of ammonia is extremely lowered and then the reaction should be carried out at a high temperature and at a low space velocity. Among the elements (A) in the formula: $Cr_xA_yO_z$, preferred ones are tin, antimony, vanadium, silver, cobalt, titanium, molybdenum, tungsten and sulfur.

The exact state of the components in the catalyst is not known, but it may contain hexa-, penta- or trivalent chromium, penta-, tetra-, or trivalent vanadium, hexa-, penta- or tetra- valent tungsten, divalent zinc, tetra- or divalent tin, tri- or divalent cobalt or nickel, tetra- or trivalent titanium, which are in the form of oxides or complex oxides, and further sulfur in a form of sulfate.

The catalyst may be composed of the catalyst components alone, i.e., without using any carrier, which may be in the form of a granule, tablet or extrusion-molded product. It may be, however, preferable to be supported on conventional carriers for the purpose of increasing the mechanical strength and the homogeneity of the catalyst components. The conventional catalyst carriers may be activated alumina, α-alumina, silica gel, alumino.silicate, diatomaceous earth, silicon carbide, or the like. The carriers may be used in the form of a granule, tablet or extrusion-molded product or in the form of a sol. When it is in the form of a sol, it may be admixed with the catalyst components and then formed to the desired forms.

The starting material for the chromium component of the present catalyst may be chromium nitrate, chromium acetate, chromic anhydride, or salts (e.g. ammonium chromate, potassium chromate, sodium chromate, ammonium bichromate, potassium bichromate, or sodium bichromate). The starting material for the nickel, cobalt and zinc may be the oxide, nitrate, chromate, carbonate, acetate, hydroxide, or complex salt thereof. The starting material for the molybdenum and tungsten may be oxides thereof (e.g. trioxide or dioxide), ammonium salt of the polyacid thereof (e.g. ammonium molybdate or ammonium tungstate), or complex salts (e.g. a chelate compound with ethanolamine). The starting material for the tin, antimony and titanium may be oxides thereof, tin tetrachloride, tin dichloride, antimony pentachloride, antimony trichloride, or titanium tetrachloride. The starting material for the vanadium may be vanadium oxides (e.g. divanadium pentaoxide, divanadium tetraoxide or divanadium trioxide), vanadium complexes (e.g. vanadyl oxalate, vanadyl chloride or a chelate compound with ethanolamine), or salts (e.g. ammonium metavanadate). The starting material for the silver may be silver oxide, silver nitrate, silver chromate, silver bichromate, or silver carbonate. The starting material for the sulfur may be acids (e.g. sulfuric acid), or salts (e.g. ammonium sulfate or chromium sulfate). The starting material for the phosphorus may be acids (e.g. phosphoric acid), oxides (e.g. phosphorus pentaoxide), or salts (e.g. ammonium phosphate or chromium phosphate). The starting material for the boron may be acids (e.g. boric acid). The starting material for the germanium may be oxides (e.g. germanium dioxide), or salts (e.g. germanium chloride). The starting material for the zirconium may be oxides (e.g. zirconium dioxide), or salts (e.g. zirconium silicate, zirconium nitrate, or zirconium sulfate).

The most preferred starting material are water soluble salts having a large water-solubility for the purpose of mixing homogeneously the catalyst components in the catalyst. When a catalyst is prepared by penetrating the catalyst component into a formed catalyst carrier, the water soluble starting materials are the most preferable.

When the catalyst is prepared by using a sol material such as silica sol or a fine powder such as silica, diatomaceous earth or alumina as the carrier, the powdery starting materials for the active catalyst component may be kneaded with the carrier together with water and the mixture is molded before or after the calcination.

Alternatively, the catalyst used in the present invention may be prepared, for example, by mixing an aqueous solution of chromic anhydride with an aqueous solution of the water soluble starting materials (i.e., in case of nickel, cobalt, silver or zinc: the nitrate or acetate thereof; in case of molybdenum, tungsten or vanadium: ammonium molybdate, ammonium tungstate or ammonium metavanadate, respectively; in case of tin: tin tetrachloride; in case of antimony: antimony trichloride; in case of titanium: titanium tetrachloride; in case of sulfur, phosphorus and boron: an acid, ammonium salt or chromate thereof; and in case of zirconium: zirconium nitrate) or with a solution of germanium dioxide in monoethanolamine so as to give a fixed atomic ratio of each metal, and penetrating the resulting mixture into an activated alumina in granule or tablet form, and then drying the penetrated product. The drying may be preferably carried out at 60° to 250° C until it becomes substantially anhydrous. After drying, the catalyst may be calcined at 300° to 1,000° C, preferably 350° to 800° C for 4 to 10 hours.

The present invention is illustrated by the following Examples but is not limited thereto.

In the Examples, the removal rate of ammonia and the production or producing rate of nitrogen oxides are calculated by the following equations: Removal rate of ammonia (%)

$$= \left[1 - \frac{\text{Concentration of ammonia in the gases at the outlet of the reactor}}{\text{Concentration of ammonia in the gases to be treated}}\right] \times 100$$

Producing rate of nitrogen oxides (%)

$$= \left[\frac{\text{Concentration of nitrogen monoxide and nitrogen dioxide in the gases at the outlet of the reactor}}{\text{Concentration of ammonia in the gases to be treated}}\right] \times 100$$

Besides, the % in the Examples means % by volume unless otherwise mentioned.

EXAMPLE 1

Monoethanolamine (9 ml) is dissolved in water (80 ml) and thereto is added ammonium paratungstate (10.4 g), and the mixture is agitated to give a solution. The solution is mixed with a solution of chromic anhydride (20.0 g) in water (100 ml).

To the mixed solution is added an activated alumina (122.4 g) and then the mixture is evaporated to 80° C to remove moisture. After the third solution is penetrated into the activated alumina carrier, it is dried at 200° C until it becomes anhydrous.

The catalyst thus obtained is charged into a furnace, and the temperature of the furnace is raised from room temperature to 650° C over a period of 2 hours. The furnace is kept at this temperature for 5 hours, and then allowed to cool to room temperature. The catalyst thus calcined has the atomic ratio of chromium, tungsten and oxygen: $Cr_{10}W_2O_{21}$.

The catalyst (1 ml) is introduced into a glass-made reaction tube having 12 mm in inside diameter. To the reaction tube is passed through a gas mixture comprising 84.7 % of nitrogen, 2.5 % of oxygen, 12.8 % of steam and 491 ppm of ammonia at a space velocity of 13,800 hr$^{-1}$ and at a reaction temperature of 350° C. The removal rate of ammonia is 100 % and the producing rate of nitrogen oxides is 0.9 %.

EXAMPLES 2 TO 18

Various catalysts as shown in Table 1 are prepared in the similar manner as described in Example 1, wherein the starting chromium and tungsten are used in the same form as in Example 1 and other starting materials are used in the following forms; vanadium: vanadyl oxalate; molybdenum: amonium molybdate; zinc, silver, nickel and cobalt: nitrate thereof; tin: tin tetrachloride; antimony: antimony trichloride; titanium: titanium tetrachloride. The catalysts are reacted with a gas mixture in the same manner as in Example 1.

Table 1

| Example No. | Catalyst component | Calcination temperature °C | Component of gas mixture | | | | Space velocity hr$^{-1}$ | Reaction temperature °C | Removal rate of ammonia % | Producing rate of nitrogen oxides % |
|---|---|---|---|---|---|---|---|---|---|---|
| | | | $N_2$ % | $N_2$ % | $N_2$ % | $NH_3$ ppm | | | | |
| 2 | $Cr_9W_4O_{24}$ | 550 | 80.9 | 2.9 | 16.2 | 424 | 15,200 | 350 | 100 | 2.1 |
| 3 | $Cr_{11}W_1O_{19.5}$ | 550 | 80.9 | 2.9 | 16.2 | 447 | 15,200 | 300 | 97.1 | 1.3 |
| 4 | $Cr_9W_2V_1O_{22.5}$ | 600 | 84.5 | 2.5 | 13.0 | 529 | 13,800 | 350 | 100 | 1.8 |
| 5 | $Cr_9V_2O_{21}$ | 600 | 80.9 | 2.9 | 16.2 | 426 | 15,200 | 400 | 100 | 2.1 |
| 6 | $Cr_9Mo_2O_{22.5}$ | 550 | 81.4 | 2.9 | 15.6 | 518 | 14,000 | 350 | 100 | 0.8 |
| 7 | $Cr_9Zn_4O_{15}$ | 400 | 84.5 | 2.5 | 13.0 | 486 | 13,800 | 350 | 100 | 7.1 |
| 8 | $Cr_9Ag_3O_{15}$ | 400 | 84.7 | 2.5 | 12.8 | 487 | 13,800 | 300 | 95.2 | 3.0 |
| 9 | $Cr_9Ni_3O_{16.5}$ | 400 | 82.0 | 3.0 | 15.0 | 498 | 15,000 | 350 | 87.2 | 9.1 |
| 10 | $Cr_9Co_3O_{16.5}$ | 400 | 81.4 | 2.9 | 15.6 | 533 | 14,000 | 300 | 95.7 | 4.0 |
| 11 | $Cr_9Sn_3O_{19.5}$ | 400 | 80.9 | 2.9 | 16.2 | 428 | 15,200 | 325 | 98.8 | 6.3 |
| 12 | $Cr_9Sb_3O_{19.5}$ | 400 | 80.9 | 2.9 | 16.2 | 428 | 15,200 | 325 | 99.7 | 3.7 |
| 13 | $Cr_{10}W_2O_{21}$ | 650 | 84.5 | 2.5 | 12.8 | 1,890 | 6,900 | 350 | 100 | 0.3 |
| 14 | $Cr_{10}V_2O_{20}$ | 650 | 84.3 | 2.5 | 13.0 | 1,890 | 6,900 | 300 | 99.2 | 0.1 |
| 15 | $Cr_{10}W_2O_{21}$ | 650 | 96.9 | 2.9 | 0 | 2,170 | 6,000 | 300 | 99.6 | 0.2 |
| 16 | $Cr_{10}V_2O_{20}$ | 650 | 96.9 | 2.9 | 0 | 2,170 | 6,000 | 300 | 97.7 | 0.2 |
| 17 | $Cr_9Ti_3O_{19.5}$ | 400 | 84.5 | 2.5 | 13.0 | 521 | 14,000 | 300 | 99.7 | 1.2 |
| 18 | $Cr_{10}V_2O_{20}$ | 650 | 82.0 | 3.0 | 15.0 | 80 | 25,000 | 350 | 100 | 0.4 |

EXAMPLE 19

Monoethanolamine (22.5 ml) is dissolved in water (200 ml) and thereto is added ammonium paratungstate (26 g), and the mixture is agitated to give a solution. The solution is mixed with a solution of chromic anhydride (50.0 g) in water (250 ml).

To the mixed solution is added silica sol (20 % by weight of $SiO_2$ is contained therein; 160 ml) and then the mixture is evaporated to dryness at 80° C and further heated at 300° C for 3 hours (primary calcination). After cooling, it is pulverized. The powdery product thus obtained is formed into a tablet and then heated at 450° C for 5 hours in air (secondary calcination). The catalyst thus calcined has the atomic ratio of chromium, tungsten and oxygen: $Cr_{10}W_2O_{21}$.

The catalyst (1 ml) is introduced into a glass-made reaction tube having 12 mm in inside diameter. To the reaction tube is passed through a gas mixture comprising 84.7 % of nitrogen, 2.5 % of oxygen, 12.8 % of steam and 514 ppm of ammonia at a space velocity of 13,800 hr$^{-1}$ and at a reaction temperature of 350° C. The removal rate of ammonia is 99.4 % and the producing rate of nitrogen oxides is 0.7 %.

EXAMPLE 20

A catalyst is prepared by using chromium anhydride, ammonium molybdate and cobalt nitrate as the starting materials in the similar manner as in Example 19. The catalyst has the atomic ratio of chromium, molybdenum, cobalt and oxygen: $Cr_9Mo_2Co_1O_{22}$.

In the same manner as in Example 19, onto the catalyst is passed through a gas mixture comprising 84.5 % of nitrogen, 2.5 % of oxygen, 13.0 % of steam and 514 ppm of ammonia at a space velocity of 13,800 hr$^{-1}$ and at a reaction temperature of 400° C. The removal rate of ammonia is 100 % and the producing rate of nitrogen oxides is 5 %.

EXAMPLE 21

A solution of chromic anhydride (18.0 g) in water (100 ml) is mixed with 2N sulfuric acid (60 ml). To the mixture is added an activated alumina (122.4 g) and then the mixture is evaporated at 80° C to remove moisture. After the solution is penetrated into the activated alumina carrier, it is dried at 200° C till it becomes anhydrous.

The catalyst thus obtained is charged into a furnace, and the temperature of the furnace is raised from room temperature to 400° C over a period of 2 hours. The furnace is kept at this temperature for 5 hours, and then allowed to cool to room temperature. The catalyst thus calcined has the atomic ratio of chromium, sulfur and oxygen: $Cr_9S_3O_{22.5}$, and no volatilization of sulfur is observed during the calcination.

The catalyst (1 ml) is introduced into a glass-made reaction tube having 12 mm in inside diameter. To the reaction tube is passed through a gas mixture comprising 84.5 % of nitrogen, 2.5 % of oxygen, 13.0 % of steam and 277 ppm of ammonia at a space velocity of 13,800 hr$^{-1}$ and at a reaction temperature of 400° C. The removal rate of ammonia is 100 % and the producing rate of nitrogen oxides is 7.2 %.

Besides, at the reaction temperature of 350° C, the removal rate of ammonia is 100 % and the producing rate of nitrogen oxides is 4.8 %.

EXAMPLES 22 TO 26

Various catalysts as shown in Table 2 are prepared in the same manner as described in Example 21 except that as the starting materials, sulfur is used in a different amount (120 ml) of 2N sulfuric acid, and further phosphorus, boron, germanium and zirconium are used in the form of phosphoric acid, boric acid, germanium dioxide and zirconium nitrate, respectively.

The catalysts are reacted with a gas mixture in the same manner as in Example 1. The results are shown in Table 2.

Besides, at the reaction temperature of 350° C, the removal rate of ammonia is 100 % and the producing rate of nitrogen oxides is 33.8 %.

What is claimed is:

1. A method for treating ammonia-containing gases to remove ammonia therefrom by oxidizing the ammonia to nitrogen gas and water in the vapor phase at an elevated temperature in the presence of molecular oxygen and with a substantial reduction in the amount of nitrogen oxides being produced, which comprises contacting the ammonia-containing gases with a metal oxide catalyst of the formula:

$$Cr_xA_yO_z$$

where Cr is chromium; A is at least one element selected from the group consisting of tin, antimony, vanadium, cobalt, silver, zinc, nickel, titanium, molybdenum, tungsten, sulfur, phosphorus, boron, germanium and zirconium; x is a numeral of 4 to 12; y is a numeral of 0.2 to 8 and z is a numeral of 6.2 to 42, at a temperature of 200° to 500° C., and in a molar ratio of oxygen to ammonia of one or more, said catalyst being prepared by kneading a slurry of (a) a chromium compound selected from a group consisting of chromium nitrate, chromium acetate, chromic anhydride, ammonium chromate, potassium chromate, sodium chromate, ammonium bicromate, potassium bichromate and sodium bichromate and (b) one or more members selected from the group consisting of an oxide, nitrate, chromate, carbonate, acetate or hydroxide of nickel, cobalt or zinc, or a complex salt thereof; a trioxide or dioxide of molybednum or tungsten, ammonium molybdate, ammonium tungstate, or a chelate compound thereof with ethanolamine; an oxide of tin, antimony or titanium, tin tetrachloride, tin dichloride, antimony pentachloride, antimony trichloride or titanium tetrachloride; divanadium pentaoxide, divanadium tetraoxide, divanadium trioxide, vanadyl oxalate, vanadyl chloride, a chelate compound thereof with ethanolamine or ammonium metavanadate; silver oxide, silver nitrate, silver chromate, silver bichromate or silver carbonate; sulfuric acid, ammonium sulfate or chro- Table 2

| Example No. | Catalyst component | Calcination temperature ° C | Component of gas mixture | | | | Space velocity hr$^{-1}$ | Reaction temperature ° C | Removal rate of ammonia % | Producing rate of nitrogen oxides % |
|---|---|---|---|---|---|---|---|---|---|---|
| | | | N$_2$ % | O$_2$ % | H$_2$O % | NH$_3$ ppm | | | | |
| 22 | Cr$_6$S$_6$O$_{27}$ | 400 | 84.5 | 2.5 | 13.0 | 277 | 13,800 | 400 | 100 | 0.0 |
| 23 | Cr$_9$P$_3$O$_{21}$ | 400 | 84.5 | 2.5 | 13.0 | 467 | 13,800 | 350 | 100 | 8.8 |
| 24 | Cr$_9$B$_3$O$_{19}$ | 400 | 84.5 | 2.5 | 13.0 | 267 | 13,800 | 300 | 99.5 | 4.6 |
| 25 | Cr$_9$Ge$_3$O$_{19.5}$ | 400 | 84.5 | 2.5 | 13.0 | 267 | 13,800 | 300 | 99.5 | 2.6 |
| 26 | Cr$_9$Zr$_3$O$_{19.5}$ | 400 | 84.5 | 2.5 | 13.0 | 273 | 13,800 | 300 | 100 | 4.3 |

REFERENCE EXAMPLE

A catalyst is prepared by using chromic anhydride in the same manner as in Example 1. The catalyst has the atomic ratio of chromium and oxygen: $Cr_{12}O_{18}$.

The catalyst is introduced into a reaction tube in the same manner as in Example 1, and thereto is passed through a gas mixture comprising 80.9 % of nitrogen, 2.9 % of oxygen, 16.2 % of steam and 413 ppm of ammonia at a space velocity of 15,200 hr$^{-1}$ and at a reaction temperature of 300° C. The removal rate of ammonia is 93.0 % and the producing rate of nitrogen oxides is 14.7 %.

mium sulfate; phosphiric acid, phosphorus pentoxide, ammonium phosphate or chromium phosphate; boric acid; germanium dioxide or germanium chloride; and zirconium dioxide, zirconium silicate, zirconium nitrate or zirconium sulfate with a carrier material selected from the group consisting of silica sol and a fine powder selected from silica, diatomaceous earth or alumina together with water, drying the mixed composition so formed at a temperature sufficient to make it substantially anhydrous and calcining said anhydrous composition at a temperature of from 300° to 1,000° C..

2. The method according to claim 1, wherein the element A is one or more members selected from the group consisting of tin, antimony, vanadium, silver, cobalt, titanium, molybdenum, tungsten and sulfur.

3. The method according to claim 1, wherein the ratio of x and y is in the range of 11.5 : 0.5 to 6 : 6.

4. The method according to claim 1, wherein the temperature is in the range of 250° to 450° C.

5. The method according to claim 1, wherein the space velocity is in the range of 1,000 to 50,000 hr$^{-1}$.

6. A method for treating ammonia-containing gases to remove ammonia therefrom by oxidizing the ammonia to nitrogen gas and water in the vapor phase at an elevated temperature in the presence of molecular oxygen and with a substantial reduction in the amount of nitrogen oxides being produced, which comprises contacting the ammonia-containing gases with a metal oxide catalyst of the formula:

$Cr_xA_yO_z$ wherein Cr is chromium; A is at least one element selected from the group consisting of tin, antimony, vanadium, cobalt, silver, zinc, nickel, titanium, molybdenum, tungsten, sulfur, phosphorus, boron, germanium and zirconium; x is a numeral of 4 to 12; y is a numeral of 0.2 to 8 and z is a numeral of 6.2 to 42, at a temperature of 200° to 500° C., and in a molar ratio of the oxygen to ammonia of one or more, said catalyst being prepared by mixing an aqueous solution of chromic anhydride with one or more aqueous solutions of a nitrate or acetate of nickel, cobalt, silver or zinc; ammonium molybdate, ammonium tungstate or ammonium metavanadate; tin tetrachloride; antimony trichloride; sulfuric acid, ammonium sulfate or chromium sulfate; phosphoric acid, ammonium phosphate or chromium phosphate; boric acid; and zirconium nitrate, or with a solution of germanium dioxide in monoethanolamine, penetrating the resulting mixture into a carrier material, drying the penetrated product and then calcining the resultant product at a temperature of 300° to 1,000° C.

* * * * *